(12) United States Patent
Zhao et al.

(10) Patent No.: US 11,683,615 B2
(45) Date of Patent: Jun. 20, 2023

(54) WIRELESS LOW-FREQUENCY COMMUNICATION METHOD AND SYSTEM

(71) Applicant: ShenZhen AFU Intelligent Internet Technology Co., Ltd., Shenzhen (CN)

(72) Inventors: Zhenhe Zhao, Shenzhen (CN); Zongliang Song, Shenzhen (CN)

(73) Assignee: SHENZHEN AFU INTELLIGENT INTERNET TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/351,000

(22) Filed: Jun. 17, 2021

(65) Prior Publication Data

US 2022/0345798 A1 Oct. 27, 2022

(30) Foreign Application Priority Data

Apr. 23, 2021 (CN) .......................... 202110445963.2

(51) Int. Cl.
*H04Q 9/00* (2006.01)
*G08B 21/18* (2006.01)

(52) U.S. Cl.
CPC ............. *H04Q 9/00* (2013.01); *G08B 21/182* (2013.01); *H04Q 2209/40* (2013.01)

(58) Field of Classification Search
CPC ..... H04Q 9/00; H04Q 2209/40; G08B 21/182
See application file for complete search history.

(56) References Cited

U.S. PATENT DOCUMENTS 4,297,557 A 10/1981 Tyler et al.
9,585,563 B2 * 3/2017 Mensinger ............ A61B 5/7282
(Continued)

FOREIGN PATENT DOCUMENTS

WO 2020014159 A1 1/2020

OTHER PUBLICATIONS

European Sesarch Report for European Application No. 21185971.5; Application Filing Date Jul. 16, 2021, dated Jan. 4, 2022 (7 pages).

*Primary Examiner* — Amine Benlagsir
(74) *Attorney, Agent, or Firm* — Cantor Colburn LLP

(57) ABSTRACT

This application discloses a wireless low-frequency communication method and a wireless low-frequency communication system. The wireless low-frequency communication method includes: a first low-frequency communication terminal modulates a first carrier signal loaded with first data into a first low-frequency signal and sends the first low-frequency signal to a second low-frequency communication terminal. The first data refers to instruction data issued by a user. When receiving the first low-frequency signal, the second low-frequency communication terminal demodulates the first low-frequency signal into the first carrier signal and analyzes the first carrier signal to obtain the first data. Communication is carried out through wireless low-frequency signals penetrating metal shields. Communication signals can be strengthened while communication distances can be increased with the metal shields. This application solves the problems of weak communication signals and short communication distances caused by wireless high-frequency signals failing to penetrate a sensor or a roaster device.

10 Claims, 4 Drawing Sheets

A first low-frequency communication terminal modulates a first carrier signal loaded with first data into a first low-frequency signal and sends the first low-frequency signal to a second low-frequency communication terminal, herein the first data refers to instruction data issued by a user — S101

When receiving the first low-frequency signal, the second low-frequency communication terminal demodulates the first low-frequency signal into the first carrier signal, and analyzes the first carrier signal to obtain the first data — S102

(56) References Cited

U.S. PATENT DOCUMENTS

| | | | |
|---|---|---|---|
| 2014/0273837 A1* | 9/2014 | McCormack | H04B 5/0037 |
| | | | 455/41.1 |
| 2015/0317896 A1* | 11/2015 | Planton | G08B 21/182 |
| | | | 340/584 |
| 2017/0031337 A1* | 2/2017 | Jablokov | G05D 7/0635 |
| 2018/0328903 A1* | 11/2018 | Von Novak, III | H04L 67/12 |
| 2018/0353003 A1 | 12/2018 | Sabata et al. | |

* cited by examiner

WIRELESS LOW-FREQUENCY COMMUNICATION METHOD AND SYSTEM

CROSS-REFERENCE TO RELATED APPLICATIONS

This application is a Non-Provisional Application which claims priority to Chinese Application No. 2021104459632 filed Apr. 23, 2021 entitled "WIRELESS LOW-FREQUENCY COMMUNICATION METHOD AND SYSTEM", which is incorporated herein by reference in its entirety.

TECHNICAL FIELD

This application relates to the field of communications, in particular to a wireless low-frequency communication method and a wireless low-frequency communication system.

BACKGROUND

It is necessary to monitor the internal temperature of food in many scenes of the food processing industry, especially for roast meat or other roasted products, the food heating degree cannot be fully reflected by measuring the external temperature and calculating time alone; thus, a large number of temperature probe products for the roast meat and other roasted products appear.

The temperature probes adopt sensors in wireless Bluetooth communications, which may be connected to external mobiles or other external devices to display temperature. However, the Bluetooth communication frequency is excessive, reaching 2.4 GHz, it is difficult to penetrate metal casings of the sensors and protective glass with metal coating on roaster devices, both communication signals and communication distances are affected in actual use, and establishment of a communication connection between the sensors and the external devices is failed when the roaster devices are closed.

For the problems of weak communication signals and short communication distances caused by that wireless high-frequency signals fail to effectively penetrate metal shields in the related art, no effective solutions have been proposed.

SUMMARY

This application is substantially intended to provide a wireless low-frequency communication method and a wireless low-frequency communication system, for solving the problems of weak communication signals and short communication distances caused by failure in effectively penetrating metal shields.

In order to achieve the above objective, according to an aspect of this application, a wireless low-frequency communication method is provided.

The wireless low-frequency communication method according to this application includes: a first low-frequency communication terminal modulates a first carrier signal loaded with first data into a first low-frequency signal and sends the first low-frequency signal to a second low-frequency communication terminal, herein the first data refers to instruction data issued by a user; when receiving the first low-frequency signal, the second low-frequency communication terminal demodulates the first low-frequency signal into the first carrier signal and analyzes the first carrier signal to obtain the first data.

Further, after the step: a first low-frequency communication terminal modulates a first carrier signal loaded with first data into a first low-frequency signal and sends the first low-frequency signal to a second low-frequency communication terminal, the method also includes: the second low-frequency communication terminal performs self-charging when receiving the first low-frequency signal.

Further, after the step: when receiving the first low-frequency signal, the second low-frequency communication terminal demodulates the first low-frequency signal into the first carrier signal and analyzes the first carrier signal to obtain the first data, the method also includes: the second low-frequency communication terminal measures to obtain second data according to the instruction data, herein the second data refers to internal temperature data of food under heating, modulates a second carrier signal loaded with the second data into a second low-frequency signal, and sends the second low-frequency signal to the first low-frequency communication terminal; and when receiving the second low-frequency signal, the first low-frequency communication terminal demodulates the second low-frequency signal into the second carrier signal and analyzes the second carrier signal to obtain the second data.

Further, after the step: when receiving the first low-frequency signal, the second low-frequency communication terminal demodulates the first low-frequency signal into the first carrier signal and analyzes the first carrier signal to obtain the first data, the method also includes: the second low-frequency communication terminal measures to obtain second data and number data according to the instruction data, herein the second data refers to internal temperature data of food under heating, modulates a second carrier signal loaded with the second data and number data into a second low-frequency signal, and sends the second low-frequency signal to the first low-frequency communication terminal; and when receiving the second low-frequency signal, the first low-frequency communication terminal demodulates the second low-frequency signal into the second carrier signal and analyzes the second carrier signal to obtain the second data and number data.

Further, after the step: when receiving the second low-frequency signal, the first low-frequency communication terminal demodulates the second low-frequency signal into the second carrier signal and analyzes the second carrier signal to obtain the second data, the method also includes: the first low-frequency communication terminal displays the second data, sends an overtemperature alarm when determining that the second data exceeds a preset temperature threshold, and sends the internal temperature data to a mobile phone terminal when receiving a request from the mobile phone terminal.

Further, after the step: when receiving the second low-frequency signal, the first low-frequency communication terminal demodulates the second low-frequency signal into the second carrier signal and analyzes the second carrier signal to obtain the second data and number data, the method also includes: the first low-frequency communication terminal displays the second data, sends an overtemperature alarm of the corresponding number when determining that the second data exceeds a preset temperature threshold, and sends the internal temperature data to a mobile phone terminal when receiving a request from the mobile phone terminal.

In order to achieve the above objective, according to another aspect of this application, a wireless low-frequency communication system is provided.

The wireless low-frequency communication system according to this application includes: a first low-frequency communication terminal configured to modulate a first carrier signal loaded with first data into a first low-frequency signal and send the first low-frequency signal to a second low-frequency communication terminal, herein the first data refers to instruction data issued by a user; and a second low-frequency communication terminal configured to, when receiving the first low-frequency signal, demodulate the first low-frequency signal into the first carrier signal and analyze the first carrier signal to obtain the first data.

Further, the second low-frequency communication terminal is also configured to perform self-charging when receiving the first low-frequency signal.

Further, the second low-frequency communication terminal is also configured to measure to obtain second data according to the instruction data, herein the second data refers to internal temperature data of food under heating, modulate the second carrier signal loaded with the second data into a second low-frequency signal and send the second low-frequency signal to the first low-frequency communication terminal. The first low-frequency communication terminal is also configured to, when receiving the second low-frequency signal, demodulate the second low-frequency signal into the second carrier signal and analyze the second carrier signal to obtain the second data, display the second data, send an overtemperature alarm when determining that the second data exceeds a preset temperature threshold, and send the internal temperature data to a mobile phone terminal when receiving a request from the mobile phone terminal.

Further, the second low-frequency communication terminal is also configured to measure to obtain second data and number data according to the instruction data, herein the second data refers to internal temperature data of food under heating, modulate the second carrier signal loaded with the second data and number data into a second low-frequency signal, and send the second low-frequency signal to the first low-frequency communication terminal. The first low-frequency communication terminal is also configured to, when receiving the second low-frequency signal, demodulate the second low-frequency signal into the second carrier signal and analyze the second carrier signal to obtain the second data and number data, display the second data and number data, send an overtemperature alarm of the corresponding number when determining that the second data exceeds a preset temperature threshold, and send the second data and number data to a mobile phone terminal when receiving a request from the mobile phone terminal.

In the embodiments of this application, a wireless low-frequency communication mode is adopted. The first low-frequency communication terminal modulates a first carrier signal loaded with first data into a first low-frequency signal and sends the first low-frequency signal to a second low-frequency communication terminal, herein the first data refers to instruction data issued by a user; when receiving the first low-frequency signal, the second low-frequency communication terminal demodulates the first low-frequency signal into the first carrier signal and analyzes the first carrier signal to obtain the first data. Thus, communication is carried out through wireless low-frequency signals effectively penetrating the metal shields, the technical effects of strengthening communication signals and increasing communication distances may be achieved in the specific scene with the metal shields, thereby solving the technical problems of weak communication signals and short communication distances caused by that wireless high-frequency signals fail to penetrate a sensor or a roaster device.

BRIEF DESCRIPTION OF THE DRAWINGS

The accompanying drawings constituting a part of this application are used to provide a further understanding of this application, so that other features, objectives, and advantages of this application become more apparent. The schematic drawings and descriptions thereof in the embodiments of this application are intended to explain this application, and do not constitute an improper limitation on this application. In the drawings.

DETAILED DESCRIPTION OF THE EMBODIMENTS

Figure 1:
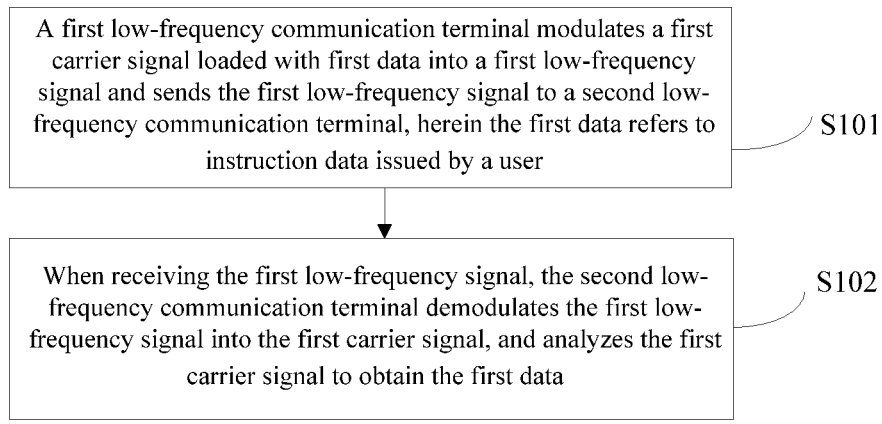
FIG. 1 is a flow diagram of a wireless low-frequency communication method according to an embodiment of the present application.

In order to make the solutions of the present application better understood by those skilled in the art, the technical solutions in the embodiments of this application will be clearly and completely described below in combination with the drawings in the embodiments of this application. Obviously, the described embodiments are not all embodiments but part of embodiments of this application. All other embodiments obtained by those of ordinary skill in the art on the basis of the embodiments in this application without creative work shall fall within the scope of protection of this application.

It should be noted that the terms "first", "second", and the like in the specification and claims of this application and in the above drawings are used to distinguish similar objects and are not necessarily used to describe a specific sequence or order. It will be appreciated that the data used in this way may be interchanged where appropriate, so that the embodiments of this application described herein may be implemented. For example, terms "include", "have" and any variations thereof are intended to cover non-exclusive inclusion, for example, a process, method, system, product or device including a series of operations or units is not necessary to be limited to the operations or units which are listed, but may include operations or units which are not clearly listed or other units or operations intrinsic to the process, the method, the product or the device.

In this application, orientation or position relationships indicated by terms "upper", "lower", "left", "right", "front", "back", "top", "bottom", "inner", "outer", "middle", "vertical", "horizontal", "transverse", "longitudinal" and the like are orientation or position relationships shown in the drawings. These terms are adopted not to limit that indicated devices or components must be in specific orientations or structured and operated in specific orientations but only to conveniently describe this application and the embodiments thereof.

In addition, part of the above terms may be adopted to indicate other meanings in addition to the orientation or position relationships. For example, the term "upper "may be adopted to indicate a certain attachment relationship or connection relationship in some cases. Those of ordinary skill in the art can understand specific implications of the above terms in this application according to specific situations.

In addition, terms "mount", "set", "provided with", "connect", "mutually connect", "socket joint" and the like should be broadly understood. For example, the terms may refer to fixed connection, detachable connection, or integration. The terms may refer to mechanical connection or electrical connection. The terms may also refer to direct connection, or indirect connection through a medium, or communication in two devices, or elements or components. Those of ordinary skill in the art can understand specific implications of the above terms in this application according to specific situations.

It is to be noted that the embodiments in this application and the features in the embodiments may be combined under the condition of no conflicts. This application is described below with reference to the drawings and in conjunction with the embodiments in detail.

According to the embodiments of this disclosure, a wireless low-frequency communication method is provided. As shown in FIG. 1, the method includes the steps from S101 to S102 below.

At S101, modulating, by a first low-frequency communication terminal, a first carrier signal loaded with first data into a first low-frequency signal and sending the first low-frequency signal to a second low-frequency communication terminal, wherein the first data refers to instruction data issued by a user.

At S102, when receiving the first low-frequency signal, demodulating, by the second low-frequency communication terminal, the first low-frequency signal into the first carrier signal and analyzing the first carrier signal to obtain the first data.

Specifically, a second low-frequency communication module is built in the first low-frequency communication terminal 10, a first low-frequency communication module is built in the second low-frequency communication terminal 20, and the second low-frequency communication module and the first low-frequency communication module match mutually to achieve wireless low-frequency communication. Specifically, application processing software is installed on the first low-frequency communication terminal 10; a user may operate to start the software, and issue instruction data for controlling work of the second low-frequency communication terminal 20 to perform temperature measurement by operation methods such as clicking and selecting on a software interface. However, Bluetooth, WiFi, and other wireless signals cannot penetrate the metal shields mentioned above. For this reason, communication adopting a low-frequency communication technology is required for penetrating the metal shields. Particularly in a scene of measuring the internal temperature of the food under heating by means of a temperature sensor, a metal casing of the sensor itself and protective glass with a metal coating on a roaster device both can be regarded as the metal shields. Therefore, in this scene, the first carrier signal where the instruction data for controlling the second low-frequency communication terminal 20 is located is required to be modulated into the first low-frequency signal first, the first low-frequency signal is allowed to penetrate the metal shields by adopting the low-frequency communication technology and to be sent to the second low-frequency terminal; after receiving the first low-frequency signal, the second low-frequency terminal demodulates the first low-frequency signal into the first carrier signal, and analyzes the first carrier signal to obtain the instruction data, so that the second low-frequency communication terminal 20 may achieve further control based on the instruction data. The first low-frequency signal effectively penetrating the metal shields is achieved. Normal communication can be achieved while communication signals can be strengthened and communication distances can be increased in a specific scene with the metal shields.

From the above descriptions, it can be seen that this application achieves the following technical effects.

In the embodiments of this application, a wireless low-frequency communication mode is adopted. The first low-frequency communication terminal 10 modulates a first carrier signal loaded with first data into a first low-frequency signal and sends the first low-frequency signal to a second low-frequency communication terminal, herein the first data refers to instruction data issued by a user; when receiving the first low-frequency signal, the second low-frequency communication terminal 20 demodulates the first low-frequency signal into the first carrier signal and analyzes the first carrier signal to obtain the first data. Thus, communication is carried out through the wireless low-frequency signals effectively penetrating the metal shields, the technical effects of strengthening the communication signals and increasing the communication distances may be achieved in the specific scene with the metal shields, thereby solving the technical problems of weak communication signals and short communication distances caused by that wireless high-frequency signals fail to penetrate a sensor or a roaster device.

According to an embodiment of the disclosure, preferably, after the step: the first low-frequency communication terminal 10 modulates a first carrier signal loaded with first data into a first low-frequency signal and sends the first low-frequency signal to a second low-frequency communication terminal 20, the method also includes the following steps.

The second low-frequency communication terminal 20 performs self-charging when receiving the first low-frequency signal.

When the second low-frequency communication terminal 20 receives the first low-frequency signal, a direct-current (DC) voltage may be generated for the reason of circuits, so that the second low-frequency communication terminal 20 can be charged by itself. Charging electric energy may provide electric energy for working of the second low-frequency communication terminal 20, so that data receiving is realized while self-charging is implemented, and normal work of the second low-frequency communication terminal 20 can be ensured on the precise without an external power supply.

According to an embodiment of this disclosure, preferably, after the step: when receiving the first low-frequency signal, the second low-frequency communication terminal 20 demodulates the first low-frequency signal into the first carrier signal and analyzes the first carrier signal to obtain the first data, the method also includes the following steps.

The second low-frequency communication terminal 20 measures to obtain second data according to the instruction data, herein the second data refers to internal temperature data of food under heating, modulates a second carrier signal loaded with the second data into a second low-frequency signal, and sends the second low-frequency signal to the first low-frequency communication terminal 10.

When receiving the second low-frequency signal, the first low-frequency communication terminal 10 demodulates the second low-frequency signal into the second carrier signal and analyzes the second carrier signal to obtain the second data.

In a scene of measuring the internal temperature of the food under heating by means of a temperature sensor, the second low-frequency communication terminal 20 may serve as the temperature sensor; after receiving the instruction data, the second low-frequency communication terminal 20 controls a temperature measurement unit to measure to obtain the internal temperature data of the food under heating according to the instruction data. Since the second low-frequency communication terminal 20 is isolated in an oven in this scene, personnel cannot obtain the internal temperature of the food under heating. Here, the measured internal temperature data is loaded to the second carrier signal and modulated into the second low-frequency signal that is sent back to the first low-frequency communication terminal 10. After receiving the second low-frequency signal, the first low-frequency communication terminal 10 demodulates the second low-frequency signal into the second carrier signal, and finally analyzes the second carrier signal to obtain the measured internal temperature data. Thus, the purpose of transmitting the measured data to the first low-frequency communication terminal 10 arranged outside is achieved, thereby providing a guarantee for the personnel to check the data to judge whether the food is cooked or not.

According to an embodiment of this disclosure, preferably, after the step: when receiving the second low-frequency signal, the first low-frequency communication terminal 10 demodulates the second low-frequency signal into the second carrier signal and analyzes the second carrier signal to obtain the second data, the method also includes the following steps.

The first low-frequency communication terminal 10 displays the second data, sends an overtemperature alarm when determining that the second data exceeds a preset temperature threshold, and sends the internal temperature data to a mobile phone terminal when receiving a request from the mobile phone terminal.

In a specific implementation, in order to directly display the internal temperature data in front of the personnel, a display is arranged on a first communication terminal to display the internal temperature data, so that the personnel may judge whether the food is cooked according to the internal temperature data (the food is considered to be cooked once the inside of the food reaches a certain temperature).

In another specific implementation, in order to improve convenience, an audio alarm, an LED light, or other display devices are arranged on the first low-frequency communication terminal 10. By means of simple logical judgment, whether the internal temperature converted from the second low-frequency signal exceeds a preset temperature threshold or not is judged, if the result is YES, then it indicates the food is cooked, the audio alarm is directly controlled to make a sound or the LED light is controlled to flash, and the alarm that the food is cooked reminds the personnel that the food is cooked.

In another specific implementation, a wireless communicator (for example, Bluetooth and WiFi) is arranged on the first low-frequency communication terminal 10, so that wireless communication such as Bluetooth and WiFi may be established through a mobile phone terminal and the first low-frequency communication terminal 10. When an APP on the mobile phone terminal sends a request, the wireless communicator sends the internal temperature data to an APP interface of the mobile phone terminal for displaying. Effective monitoring can also be realized even when the personnel is not near the first low-frequency communication terminal 10.

Optionally, the internal temperature data may also be periodically forwardly sent to the mobile phone terminal that establishes the wireless communication such as Bluetooth and WiFi.

In the implementation, preferably, communication frequency of the first low-frequency signal and the second low-frequency signal may be about 125 KHz.

According to an embodiment of this disclosure, preferably, after the step: when receiving the first low-frequency signal, the second low-frequency communication terminal 20 demodulates the first low-frequency signal into the first carrier signal and analyzes the first carrier signal to obtain the first data, the method also includes the following steps.

The second low-frequency communication terminal 20 measures to obtain second data and number data according to the instruction data, herein the second data refers to internal temperature data of food under heating, modulates a second carrier signal loaded with the second data and number data into a second low-frequency signal, and sends the second low-frequency signal to the first low-frequency communication terminal 10.

When receiving the second low-frequency signal, the first low-frequency communication terminal 10 demodulates the second low-frequency signal into the second carrier signal and analyzes the second carrier signal to obtain the second data and number data.

In a scene of measuring the internal temperature of the food under heating by means of a temperature sensor, the second low-frequency communication terminal may serve as the temperature sensor; after the second low-frequency communication terminal 20 receives the instruction data, a temperature measurement unit, with a corresponding number, of the second low-frequency communication terminal 20 is controlled to measure to obtain the internal temperature data of the food under heating according to the instruction data. Since the second low-frequency communication terminal 20 is isolated in an oven in this scene, personnel cannot obtain the internal temperature of the food under heating. Here, the measured internal temperature data and number data are loaded to the second carrier signal and modulated into the second low-frequency signal that is sent back to the first low-frequency communication terminal 10. After receiving the second low-frequency signal, the first low-frequency communication terminal 10 demodulates the second low-frequency signal into the second carrier signal, and finally analyzes the second carrier signal to obtain the measured internal temperature data and number data. Thus, the purpose of transmitting the measured data and corresponding number to the first low-frequency communication terminal 10 arranged outside is achieved, thereby providing a guarantee for the personnel to check the data to judge which food under heating, corresponding to the second low-frequency communication terminal 20, is cooked.

According to an embodiment of this disclosure, preferably, after the step: when receiving the second low-frequency signal, the first low-frequency communication terminal 10 demodulates the second low-frequency signal into the second carrier signal and analyzes the second carrier signal to obtain the second data and number data, the method also includes the following steps.

The first low-frequency communication terminal displays the second data and number data, sends an overtemperature alarm of the corresponding number when determining that the second data exceeds a preset temperature threshold, and sends the second data and number data to a mobile phone terminal when receiving a request from the mobile phone terminal.

In a specific implementation, in order to directly display the internal temperature data in front of personnel, a display is arranged on the first low-frequency communication terminal to display the internal temperature and number data, so that the personnel may judge which food, corresponding to the first low-frequency communication terminal is cooked according to the internal temperature and number data (the food is considered to be cooked once the inside of the food reaches a certain temperature).

In another specific implementation, in order to improve convenience, an audio alarm, an LED light, or other display devices are arranged on the first low-frequency communication terminal 10. By means of simple logical judgment, whether the internal temperature converted from the second low-frequency signal exceeds a preset temperature threshold or not is judged, if the result is YES, then it indicates the food is cooked, the audio alarm is directly controlled to make a sound or the LED light is controlled to flash, and the alarm that the food is cooked reminds people that the food is cooked. Moreover, the corresponding number is displayed on an interface of the display to remind the personnel which food corresponding to the second low-frequency communication terminal 20 is cooked.

In another specific implementation, a wireless communicator (for example, Bluetooth and WiFi) is arranged on the first low-frequency communication terminal 10, so that wireless communication such as Bluetooth and WiFi may be established through a mobile phone terminal and the first low-frequency communication terminal 10. When an APP on the mobile phone terminal sends a request, the wireless communicator sends the internal temperature and number data to an APP interface of the mobile phone terminal for displaying. Effective monitoring can also be realized even when the personnel is not near the first low-frequency communication terminal 10.

Alternatively, the internal temperature data may also be periodically forwardly sent to the mobile phone terminal that establishes the wireless communication such as Bluetooth and WiFi.

In a preferred implementation, the first low-frequency communication terminal 10 includes: a processor in which application processing software is installed, and a second low-frequency communication module, a display, a wireless communicator, and an audio alarm that are electrically connected to the processor. The second low-frequency communication module receives and transmits data in a low frequency form, the display displays the data, the wireless communicator is configured to establish wireless communication with the mobile phone terminal, and the audio alarm sends an alarm.

Figure 3:
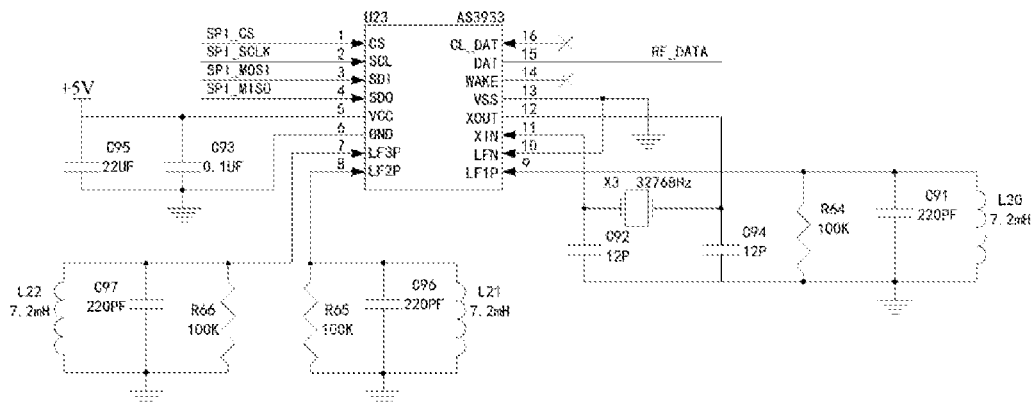
FIG. 3 is a schematic circuit diagram of a second low-frequency communication module according an embodiment of this application.

In the embodiment, as shown in FIG. 3, the second low-frequency communication module includes: a wake-up chip, and three coil circuits, a resonance circuit and a crystal oscillator circuit that are electrically connected to the wake-up chip. Specifically, the three coil circuits L20, L21, and L22 refer to integrated coils in three directions, which may respectively receive electromagnetic waves at various angles in a three-dimensional direction, and form a resonance loop with capacitors C91, C96, and C97 in the resonance circuit, to increase a received signal strength at a 125 KHz point. When the wake-up chip (processor) outputs the first carrier signal carrying the instruction data after processing, the foregoing circuits may modulate the first carrier signal into the first low-frequency signal and send the first low-frequency signal to the first low-frequency communication module. Resistors R64, R65, and R66 in the resonance circuit are configured to reduce quality factor of the resonance loop and increase antenna bandwidth, thereby facilitating improvement of flexibility of data receiving. A crystal oscillator X3 provides a reference clock to the wake-up chip. Interfaces SPI_CS, SPI_SCLK, SPI_MOSI, SPI_MISO of the wake-up chip provide communication interfaces for communication with a single-chip microcomputer and are used for configuration of an internal register. A RF_DATA wire outputs demodulated data of a modulated signal and is connected to the single-chip microcomputer to analyze data sent from a probe. Thus, a chip U23 has an automatic capacitance regulating capacity, and may regulate resonance parameters by means of software to adapt to errors generated in production of inductance coils and capacitors.

In a preferred implementation, the second low-frequency communication terminal 20 includes: a single-chip microcomputer, a temperature probe electrically connected to the single-chip microcomputer, and a first low-frequency communication module electrically connected to the single-chip microcomputer. Modulation, demodulation and control are implemented by means of the single-chip microcomputer. The temperature probe measures temperature. The first low-frequency communication module receives and transmits data in a low frequency form.

Figure 4:
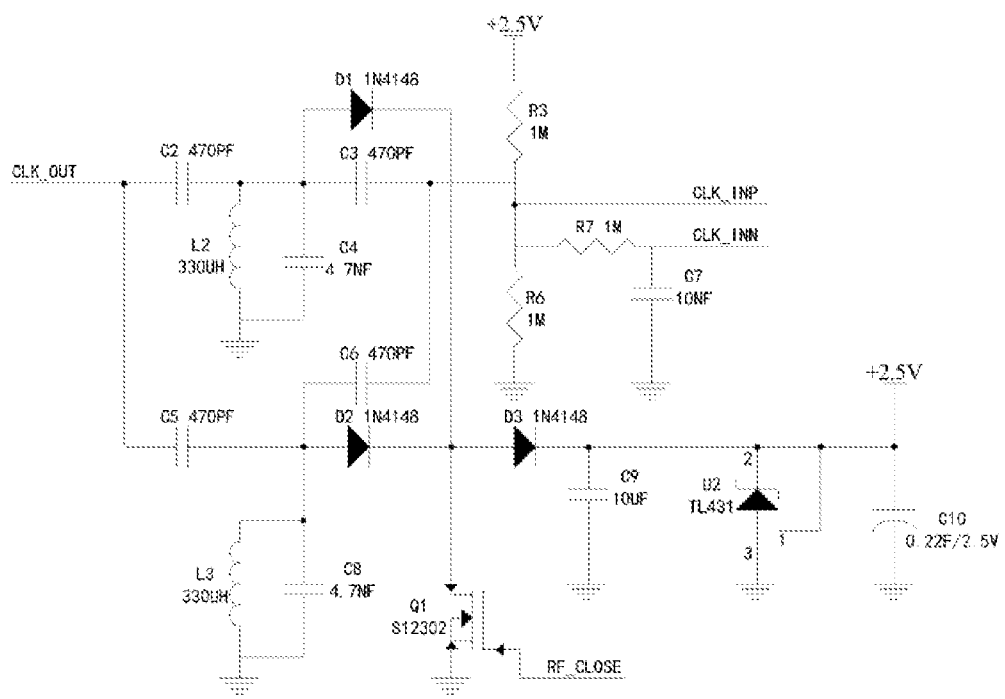
FIG. 4 is a schematic circuit diagram of a first low-frequency communication module according an embodiment of this application.

In the embodiment, internal circuit principles of the first low-frequency communication module are as shown in FIG. 4. Specifically, coils in two directions are adopted for communication to achieve communication at various angles. A ferrite core is arranged in the middle, and the coils are wound from directions X and Y, so that good sensitivity to electromagnetic wave receiving and transmission in both directions is achieved, an excellent signal transceiving effect may be achieved in an actual service environment of the temperature probe, and absorption of electromagnetic wave energy may be facilitated in a wireless charging process. L2 and L3 represent multi-turn antenna coils crossed mutually, and are respectively subjected to resonance oscillation with capacitors C4 and C8 to obtain the communication frequency about 125 KHz, and respectively receive electromagnetic waves from two directions. An alternating-current (AC) voltage generated by the resonance oscillation is rectified by means of diodes D1 and D2 to be output, and then is filtered into a DC voltage through a capacitor C9 so as to charge a super capacitor or a rechargeable battery C10. U2 represents a parallel voltage regulator chip, which maintains an output voltage within a permissible range to avoid damages to the super capacitor or the rechargeable battery caused by over-high voltage. Two channels of output signals of an inductance-capacitance resonance loop are output to a positive input terminal of a comparator of the single-chip microcomputer through capacitors C3 and C6, and then are filtered through a resistor R7 and a capacitor C7 to be output to a negative input terminal of the comparator. Two channels of input have obvious voltage difference and phase difference on AC signals. The input AC signals may be directly shaped into a square wave form through the comparator inside the single-chip microcomputer. The data sent from the first low-frequency communication terminal 10 may be analyzed through program decoding. An output pin CLK_OUT of the single-chip microcomputer outputs carrier data of a transmitted signal, and 125 KHz carrier data obtained by modulating in an ASK mode is transmitted to antenna coils L2 and L3 through capacitors C2 and C5. The two coils are respectively subjected to resonance oscillation with capacitors C4 and C8 to form an electromagnetic field for radiation in space, so that the data is sent to the first low-frequency communication terminal 10. An N-Metal-Oxide-Semiconductor (NMOS) field-effect transistor Q1 is connected behind the diodes D1 and D2 in two channels; switching is controlled through a pin RF_CLOSE of the single-chip microcomputer, Q1 may be switched on after carrier is switched off in transmitting of a ASK signal of the data, free oscillation energy of the loop may be absorbed on the output coil through D1 and D2, an effect of rapidly switching off the electromagnetic field may be implemented, and an ideal turn-off waveform is formed from a transmitted waveform. When the electromagnetic field is on or off through Q1, a diode D3 may prevent a reverse power supply to avoid releasing of electric power on the super capacitor or the rechargeable battery. Resistors R3 and R6 are configured to provide a bias voltage to the comparator inside the single-chip microcomputer to keep the comparator at an intermediate ideal operating point to detect the input signal. Thus, low-frequency communication with external devices is realized while self-charging is implemented. In the case of failure in thermoelectric power generation, C1 may be charged while communicating with the external devices, so that the purpose of supplying power to the first low-frequency communication module and the measuring probe can be achieved.

Figure 6:
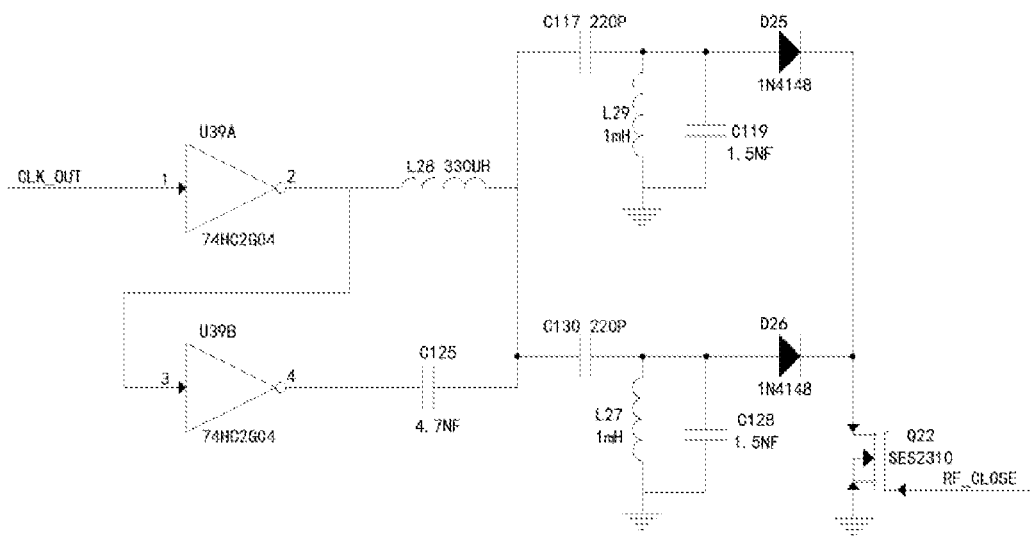
FIG. 6 is a circuit diagram of internal circuit principles of a first low-frequency communication module in an implementation solution.

In an optional implementation solution, internal circuit principles of the first low-frequency communication module are as shown in FIG. 6. Specifically, U39 represents an output buffer with double NOT gates, for improving an output current. Inductance coils L26, L29, and L27 are respectively wound on a ferrite core in three directions. L26 is wound in a Z-axis direction, substantially for series resonance with a capacitor C125 to produce a high-amplitude AC voltage, here the voltage amplitude is obtained by multiplying a loop Q-value by a drive voltage. A high-voltage AC signal is coupled to two parallel resonance loops through capacitors C117 and C130, one loop is composed of L29 and C119, and the other one is composed of L27 and C126. The two loops are subjected to resonance oscillation at an output carrier frequency, thereby effectively increasing emission electric field intensity. Diodes D25, D26 and NMOS field-effect transistor Q22 form a switching circuit. When the carrier signal pin CLK_OUT does not output, the signal pin RF_CLOSE may be controlled to boost the voltage to turn on Q22, thereby releasing energy of the two resonance loops to reduce a damped oscillation cycle. Two NOT gates in the circuit form a differential drive output, which may double the output energy and effectively increase a transmission distance.

Figure 7:
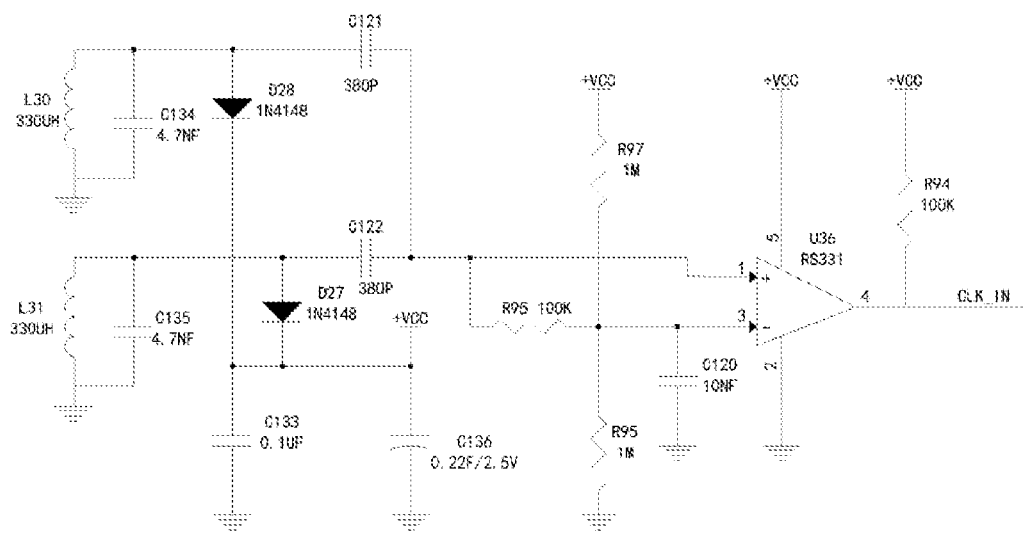
FIG. 7 is a circuit diagram of internal circuit principles of a first low-frequency communication module in another implementation solution.

In another optional implementation solution, internal circuit principles of the first low-frequency communication module are as shown in FIG. 7. Specifically, in order to cooperate to enhance a transmitting circuit, charging and data receiving coils in the probe are separated from a transmitting coil and are wound on the same ferrite core, and the inductance and number of turns of the coil in a transmitting part are greater than those of the coil in a receiving part, so that drop of the transmitted signal caused by reverse charging of the electromagnetic wave through the receiving coil is greatly reduced during working of the transmitting coil.

An inductance coil L30 and a capacitor C134, together with an inductance coil L31 and a capacitor C135, form a resonance loop for receiving an external magnetic field signal. The received electromagnetic wave generates an AC voltage that is detected through diodes D26 and D27 and rectified through a capacitor C133 so as to charge a super capacitor or a chargeable lithium battery C136. Moreover, an AC carrier signal is input to a positive input terminal of a comparator U36 through capacitors C121 and C129. The AC signal in the other channel is filtered through a resistor R85 and a capacitor C120 to generate a phase difference that is input to a negative input terminal of the comparator; by signal comparison, a square-wave CLK_IN signal is output to the single-chip microcomputer to perform a decoding process. Resistors R97 and R95 are configured for biasing of a static input voltage of the comparator to achieve an ideal working voltage. The resistor R94 is configured for pull-up of the output signal.

Figure 5:
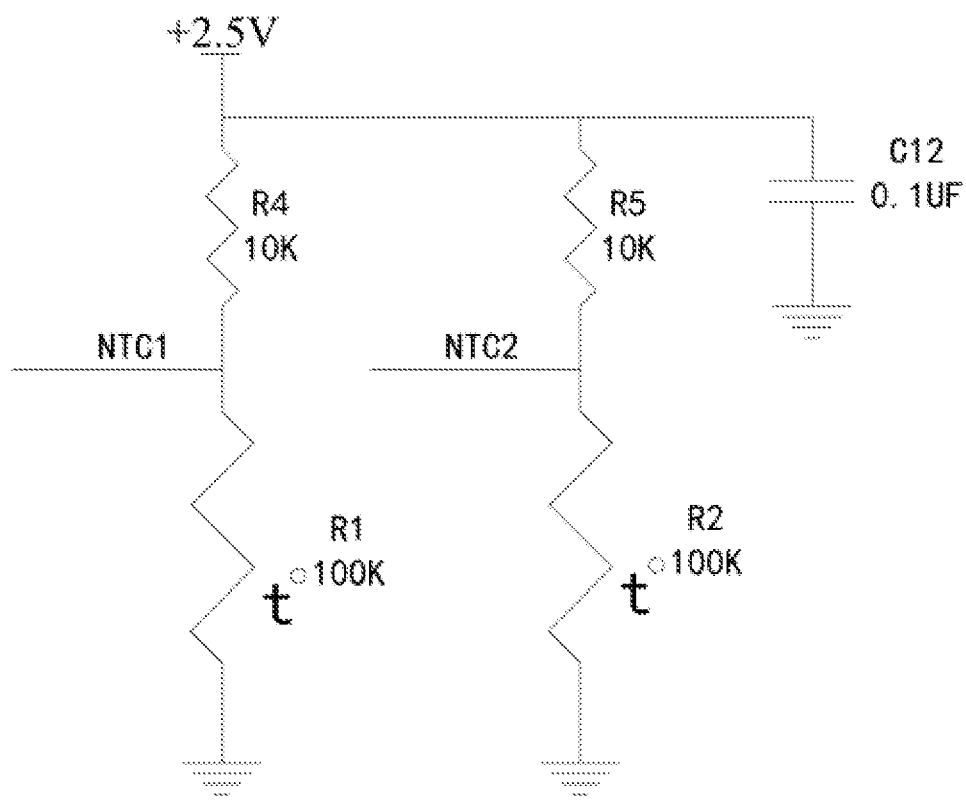
FIG. 5 is a schematic circuit diagram of a temperature probe according an embodiment of this application.

In the embodiment, as shown in FIGS. 5, R1 and R2 in the temperature probe represent NTC thermistor sensors for temperature measurement, one of the sensors is mounted at the tip of the temperature probe and inserted inside the roast meat to measure an internal temperature thereof. The other one is mounted outside the temperature probe and used for measuring an external temperature. R4 and R5 represent bias resistors with low resistance values, which are configured to improve temperature measurement precision in a high-temperature environment. A capacitor C12 refers to a filter capacitor for reducing interference.

Figure 2:
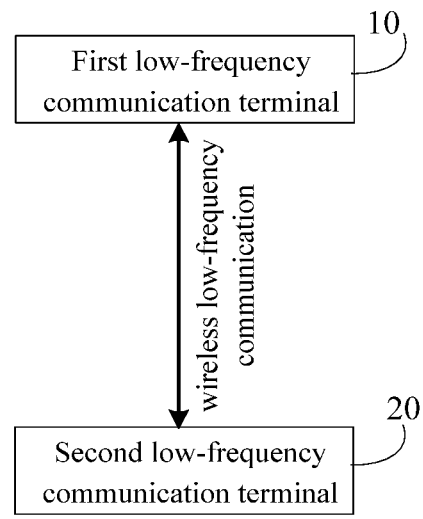
FIG. 2 is a schematic structural diagram of a wireless low-frequency communication system according to an embodiment of this application.

According to the embodiments of the disclosure, a wireless low-frequency communication system is further provided. As shown in FIG. 2, the system includes:

a first low-frequency communication terminal 10 configured to modulate a first carrier signal loaded with first data into a first low-frequency signal and send the first low-frequency signal to a second low-frequency communication terminal 20, herein the first data refers to instruction data issued by a user; and the second low-frequency communication terminal 20 configured to, when receiving the first low-frequency signal, demodulate the first low-frequency signal into the first carrier signal and analyze the first carrier signal to obtain the first data.

Specifically, a second low-frequency communication module is built in the first low-frequency communication terminal 10, a first low-frequency communication module is built in the second low-frequency communication terminal 20, and the second low-frequency communication module and the first low-frequency communication module match mutually to achieve wireless low-frequency communication. Specifically, application processing software is installed on the first low-frequency communication terminal 10; a user may start the software by operation, and issue instruction data for controlling work of the second low-frequency communication terminal 20 to perform temperature measurement by operation methods such as clicking and selecting on a software interface. However, Bluetooth, WiFi, or other wireless signals cannot penetrate the metal shields mentioned above. For this reason, communication adopting a low-frequency communication technology is required for penetrating the metal shields. Particularly in a scene of measuring the internal temperature of the food under heating by means of a temperature sensor, a metal casing of the sensor itself and protective glass with a metal coating on a roaster device both can be regarded as the metal shields. Therefore, in this scene, the first carrier signal where the instruction data for controlling the second low-frequency communication terminal 20 is located is required to be modulated into a first low-frequency signal first, the first low-frequency signal is allowed to penetrate the metal shields through the low-frequency communication technology and to be sent to the second low-frequency terminal; after receiving the first low-frequency signal, the second low-frequency terminal demodulates the first low-frequency signal into the first carrier signal, and analyzes the first low-frequency signal to obtain the instruction data, so that the second low-frequency communication terminal 20 may achieve further control based on the instruction data. The first low-frequency signal effectively penetrating the metal shields is achieved. Normal communication can be achieved while communication signals can be strengthened and communication distances can be increased in a specific scene with the metal shields.

From the above descriptions, it can be seen that this application achieves the following technical effects.

In the embodiments of this application, a wireless low-frequency communication mode is adopted. The first low-frequency communication terminal 10 modulates a first carrier signal loaded with first data into a first low-frequency signal and sends the first low-frequency signal to a second low-frequency communication terminal, herein the first data refers to instruction data issued by a user; when receiving the first low-frequency signal, the second low-frequency communication terminal 20 demodulates the first low-frequency signal into the first carrier signal and analyzes the first carrier signal to obtain the first data. Thus, communication is carried out through the wireless low-frequency signals effectively penetrating the metal shields, the technical effects of strengthening the communication signals and increasing the communication distances may be achieved in the specific scene with the metal shields, thereby solving the technical problems of weak communication signals and short communication distances caused by that wireless high-frequency signals fail to penetrate a sensor or a roaster device.

According to an embodiment of the disclosure, preferably, the second low-frequency communication terminal 20 is also configured to perform self-charging when receiving the first low-frequency signal.

When the second low-frequency communication terminal 20 receives the first low-frequency signal, a DC voltage may be generated for the reason of circuits to charge the second low-frequency communication terminal 20. Charging electric energy may provide electric energy for working of the second low-frequency communication terminal 20, so that data receiving is realized while self-charging is implemented, and normal work of the second low-frequency communication terminal 20 can be ensured on the precise without an external power supply.

According to an embodiment of the disclosure, preferably, the second low-frequency communication terminal 20 is also configured to measure to obtain second data according to the instruction data, herein the second data refers to internal temperature data of food under heating, modulate a second carrier signal loaded with the second data into a second low-frequency signal, and send the second low-frequency signal to the first low-frequency communication terminal 10.

The first low-frequency communication terminal 10 is also configured to, when receiving the second low-frequency signal, demodulate the second low-frequency signal into the second carrier signal and analyze the second carrier signal to obtain the second data, display the second data, send an overtemperature alarm when determining that the second data exceeds a preset temperature threshold, and send the internal temperature data to a mobile phone terminal when receiving a request from the mobile phone terminal.

In a scene of measuring the internal temperature of the food under heating by means of a temperature sensor, the second low-frequency communication terminal may serve as the temperature sensor; after the second low-frequency communication terminal 20 receives the instruction data, a temperature measurement unit is controlled to measure to obtain an internal temperature data of food under heating according to the instruction data. Since the second low-frequency communication terminal 20 is isolated in an oven in this scene, personnel cannot obtain the internal temperature of the food under heating. Here, the measured internal temperature data is loaded to the second carrier signal and modulated into the second low-frequency signal that is sent back to the first low-frequency communication terminal 10. After receiving the second low-frequency signal, the first low-frequency communication terminal 10 demodulates the second low-frequency signal into the second carrier signal, and finally analyzes the second carrier signal to obtain the measured internal temperature data. Thus, the purpose of transmitting the measured data to the first low-frequency communication terminal 10 arranged outside is achieved, thereby providing a guarantee for the personnel to check the data to judge whether the food is ready.

In a specific implementation, in order to directly display the internal temperature data in front of the personnel, a display is arranged on a first communication terminal to display the internal temperature data, so that the personnel may judge whether the food is cooked according to the internal temperature data (the food is considered to be cooked once the inside of the food reaches a certain temperature).

In another specific implementation, in order to improve convenience, an audio alarm, an LED light, or other display devices are arranged on the first low-frequency communication terminal 10. By means of simple logical judgment, whether the internal temperature converted from the second low-frequency signal exceeds a preset temperature threshold or not is judged, if the result is YES, then it indicates the food is cooked, the audio alarm is directly controlled to make a sound or the LED light is controlled to flash, and the alarm that the food is cooked reminds the personnel that the food is cooked.

In another specific implementation, a wireless communicator (for example, Bluetooth and WiFi) is arranged on the first low-frequency communication terminal 10, so that wireless communication such as Bluetooth and WiFi may be established through a mobile phone terminal and the first low-frequency communication terminal 10. When an APP on the mobile phone terminal sends a request, the wireless communicator sends the internal temperature data to an APP interface of the mobile phone terminal for displaying. Effective monitoring can also be realized even when the personnel is not near the first low-frequency communication terminal 10.

Alternatively, the internal temperature data may also be periodically forwardly sent to the mobile phone terminal that establishes the wireless communication such as Bluetooth and WiFi.

In the implementation, preferably, communication frequency of the first low-frequency signal and the second low-frequency signal may be about 125 KHz.

According to an embodiment of the disclosure, preferably, the second low-frequency communication terminal 20 is also configured to measure to obtain second data and number data according to the instruction data, herein the second data refers to internal temperature data of food under heating, modulate a second carrier signal loaded with the second data and number data into a second low-frequency signal, and send the second low-frequency signal to the first low-frequency communication terminal 10.

The first low-frequency communication terminal 10 is also configured to, when receiving the second low-frequency signal, demodulate the second low-frequency signal into the second carrier signal and analyze the second carrier signal to obtain the second data and number data; display the second data, send an overtemperature alarm of the corresponding number when determining that the second data exceeds a preset temperature threshold, and send the internal temperature data to a mobile phone terminal when receiving a request from the mobile phone terminal.

In a scene of measuring the internal temperature of the food under heating by means of a temperature sensor, the second low-frequency communication terminal may serve as the temperature sensor; after the second low-frequency communication terminal 20 receives the instruction data, a temperature measurement unit, with a corresponding number, of the second low-frequency communication terminal 20 is controlled to measure to obtain the internal temperature data of the food under heating according to the instruction data. Since the second low-frequency communication terminal 20 is isolated in an oven in this scene, personnel cannot obtain the internal temperature of the food under heating. Here, the measured internal temperature data and number data are loaded to the second carrier signal and modulated into the second low-frequency signal that is sent back to the first low-frequency communication terminal 10. After receiving the second low-frequency signal, the first low-frequency communication terminal 10 demodulates the second low-frequency signal into the second carrier signal, and finally analyzes the second carrier signal to obtain the measured internal temperature data and number data. Thus, the purpose of transmitting the measured data and corresponding number to the first low-frequency communication terminal 10 arranged outside is achieved, thereby providing a guarantee for the personnel to check the data to judge which food under heating, corresponding to the second low-frequency communication terminal 20, is cooked.

In a specific implementation, in order to directly display the internal temperature data in front of the personnel, a display is arranged on a first communication terminal to display the internal temperature and number data, so that personnel may judge which food, corresponding to the first low-frequency communication terminal, is cooked according to the internal temperature and number data (the food is considered to be cooked once the internal food of the food reaches a certain temperature).

In another specific implementation, in order to improve convenience, an audio alarm, an LED light, or other display devices are arranged on the first low-frequency communication terminal 10. By means of simple logical judgment, whether the internal temperature converted from the second low-frequency signal exceeds a preset temperature threshold or not is judged, if the result is YES, then it indicates the food is cooked, and the audio alarm is directly controlled to make a sound or the LED light is controlled to flash, and the alarm that the food is cooked reminds people that the food is cooked. Moreover, the corresponding number is displayed on an interface of the display to remind the personnel which food, corresponding to the second low-frequency communication terminal 20, is cooked.

In another specific implementation, a wireless communicator (for example, Bluetooth and WiFi) is arranged on the first low-frequency communication terminal 10, so that wireless communication such as Bluetooth and WiFi may be established through a mobile phone terminal and the first low-frequency communication terminal 10. When an APP on the mobile phone terminal sends a request, the wireless communicator sends the internal temperature and number data to an APP interface of the mobile phone terminal for displaying. Effective monitoring can also be realized even when the personnel is not near the first low-frequency communication terminal 10.

Optionally, the internal temperature data may also be periodically forwardly sent to the mobile phone terminal that establishes wireless communication such as Bluetooth and WiFi.

In a preferred implementation, the first low-frequency communication terminal 10 includes: a processor in which application processing software is installed, and a second low-frequency communication module, a display, a wireless communicator, and an audio alarm that are electrically connected to the processor. The second low-frequency communication module receives and transmits data in a low frequency form, the display displays the data, the wireless communicator is configured to establish the wireless communication with the mobile phone terminal, and the audio alarm sends an alarm.

In the embodiment, as shown in FIG. 3, the second low-frequency communication module includes: a wake-up chip, and three coil circuits, a resonance circuit and a crystal oscillator circuit that are electrically connected to the wake-up chip. Specifically, the three coil circuits L20, L21, and L22 refer to integrated coils in three directions, which may respectively receive electromagnetic waves at various angles in a three-dimensional direction, and form a resonance loop with capacitors C91, C96, and C97 in the resonance circuit, to increase a received signal strength at a 125 KHz point. When the wake-up chip (processor) outputs the first carrier signal carrying the instruction data after processing, the foregoing circuits may modulate the first carrier signal into the first low-frequency signal and send the first low-frequency signal to the first low-frequency communication module. Resistors R64, R65, and R66 in the resonance circuit are configured to reduce quality factor of the resonance loop and increase antenna bandwidth, thereby facilitating improvement of flexibility of data receiving. A crystal oscillator X3 provides a reference clock to the wake-up chip. Interfaces SPI_CS, SPI_SCLK, SPI_MOSI, SPI_MISO of the wake-up chip provide communication interfaces for communication with the single-chip microcomputer and are used for configuration of an internal register. A RF_DATA wire outputs demodulated data of a modulated signal and is connected to the single-chip microcomputer to analyze data sent from a probe. Thus, a chip U23 has an automatic capacitance regulating capacity, and may regulate resonance parameters by means of software to adapt to errors generated in production of inductance coils and capacitors.

In a preferred implementation, the second low-frequency communication terminal 20 includes: a single-chip microcomputer, a temperature probe electrically connected to the single-chip microcomputer, and a first low-frequency communication module electrically connected to the single-chip microcomputer. Modulation, demodulation and control are implemented by means of the single-chip microcomputer. The temperature probe measures temperature. The first low-frequency communication module receives and transmits data in a low frequency form.

In the embodiment, internal circuit principles of the first low-frequency communication module are as shown in FIG. 4. Specifically, coils in two directions are adopted for communication to achieve communication at various angles. A ferrite core is arranged in the middle, and the coils are wound from directions X and Y, so that good sensitivity to electromagnetic wave receiving and transmission in both directions is achieved, an excellent signal transceiving effect may be achieved in an actual service environment of the temperature probe, and absorption of electromagnetic wave energy may be facilitated in a wireless charging process. L2 and L3 represent multi-turn antenna coils crossed mutually, are respectively subjected to resonance oscillation with capacitors C4 and C8 to obtain the communication frequency about 125 KHz, and respectively receive electromagnetic waves from two directions. An AC voltage generated by the resonance is rectified by means of diodes D1 and D2 to be output, and then is filtered through a capacitor C9 to obtain DC voltage so as to charge a super capacitor or a rechargeable battery C10. U2 represents a parallel voltage regulator chip, which maintains an output voltage within a permissible range to avoid damages to the super capacitor or the rechargeable battery caused by over-high voltage. Two channels of output signals of an inductance-capacitance resonance loop are output to a positive input terminal of a comparator of the single-chip microcomputer through capacitors C3 and C6, and then are filtered through a resistor R7 and a capacitor C7 to be output to a negative input terminal of the comparator. Two channels of input have obvious voltage difference and phase difference on AC signals. The input AC signals may be directly shaped into a square wave form through the comparator inside the single-chip microcomputer. The data sent from the first low-frequency communication terminal 10 may be analyzed through program decoding. An output pin CLK_OUT of the single-chip microcomputer outputs carrier data of a transmitted signal, and 125 KHz carrier data obtained by modulating in an ASK mode is transmitted to antenna coils L2 and L3 through capacitors C2 and C5. The two coils are respectively subjected to resonance oscillation with capacitors C4 and C8 to form an electromagnetic field for radiation in space, so that he data is sent to the first low-frequency communication terminal 10. An NMOS field-effect transistor Q1 is connected behind diodes D1 and D2 in two channels; switching is controlled through a pin RF_CLOSE of the single-chip microcomputer, so that Q1 may be switched on after carrier is switched off in transmitting of a ASK signal of the data, free oscillation energy of the loop may be absorbed on an output coil through D1 and D2, an effect of rapidly switching off the electromagnetic field may be achieved, and an ideal turn-off waveform is formed from a transmitted waveform. When the electric field is on or off through Q1, a diode D3 may prevent a reverse power supply to avoid releasing of electric energy on the super capacitor or the rechargeable battery. Resistors R3 and R6 are configured to provide bias voltage to the comparator inside the single-chip microcomputer to keep the comparator at an intermediate ideal operating point to detect the input signal. Thus, low-frequency communication with external devices is realized while self-charging is implemented. In the case of failure in thermoelectric power generation, C1 may be charged while communicating with the external devices, so that the purpose of supplying power to the first low-frequency communication module and the temperature probe can be achieved.

In another preferred implementation solution, internal circuit principles of the first low-frequency communication module are as shown in FIG. 6. Specifically, U39 represents an output buffer with double NOT gates, for improving an output current. Inductance coils L26, L29, and L27 are respectively wound on a ferrite core in three directions. L26 is wound in a Z-axis direction, substantially for series resonance with a capacitor C125 to produce a high-amplitude AC voltage, here the voltage amplitude is obtained by multiplying a loop Q-value by a drive voltage. A high-voltage AC signal is coupled to two parallel resonance loops through capacitors C117 and C130, one loop is composed of L29 and C119, and the other one is composed of L27 and C126. The two loops are subjected to resonance oscillation at an output carrier frequency, thereby effectively increasing emission electric field intensity. Diodes D25 and D26 and an NMOS field-effect transistor Q22 form a switching circuit. When the carrier signal pin CLK_OUT does not output, the signal pin RF_CLOSE may be controlled to boost the voltage to switch on Q22, thereby releasing energy of the two resonance loops to reduce a damped oscillation cycle. Two NOT gates in the circuit form a differential drive output, which may double the output energy and effectively increase a transmission distance.

In yet another preferred implementation solution, the internal circuit principles of the first low-frequency communication module are as shown in FIG. 7. Specifically, in order to cooperate to enhance a transmitting circuit, charging and data receiving coils in the probe are separated from a transmitting coil, and are wound on the same ferrite core, and the inductance and number of turns of the coil in a transmitting part are greater than those of the coil in a receiving part, so that drop of the transmitted signal caused by reverse charging of the electromagnetic wave through the receiving coil is greatly reduced during working of the transmitting coil. An inductance coil L30 and a capacitor C134, together with an inductance coil L31 and a capacitor C135, form a resonance loop for receiving an external magnetic field signal. The received electromagnetic wave generates an AC voltage that is detected through diodes D26 and D27 and rectified through a capacitor C133 so as to charge a super capacitor or a chargeable lithium battery C136. Moreover, an AC carrier signal is input to a positive input terminal of a comparator U36 through capacitors C121 and C129. The AC signal in the other channel is filtered through a resistor R85 and a capacitor C120 to generate a phase difference that is input to a negative input terminal of the comparator; by signal comparison, a square-wave CLK_IN signal is output to the single-chip microcomputer to perform a decoding process. Resistors R97 and R95 are configured for biasing of a static input voltage of the comparator to achieve an ideal working voltage. The resistor R94 is configured for pull-up of the output signal.

In the embodiment, as shown in FIGS. 5, R1 and R2 in the temperature probe represent NTC thermistor sensors for temperature measurement, one of the sends is mounted at the tip of the temperature probe and inserted inside the roast meat to measure an internal temperature thereof. The other one is mounted outside the temperature probe and used for measuring an external temperature. R4 and R5 represent bias resistors with low resistance values, which are configured to improve temperature measurement precision in a high-temperature environment. A capacitor C12 refers to a filter capacitor for reducing interference.

According to the embodiments of the disclosure, an oven with a wireless low-frequency communication system is further provided. The oven includes: an oven body, and the wireless communication system arranged in the oven body. The first low-frequency communication terminal 10 is integrated to a panel of the oven body, and the second low-frequency communication terminal 20 is arranged in the oven body. The oven achieves the same technical effects as the wireless low-frequency communication system.

The above are only the preferred embodiments of this application and not intended to limit this application. For those skilled in the art, this application can have various modifications and variations. Any modifications, equivalent replacements, improvements and the like within the spirit and principle of this application shall fall within the scope of protection as defined in the appended claims of this application.

What is claimed is:

1. A wireless low-frequency communication method, comprising:
    modulating, by a first low-frequency communication terminal, a first carrier signal loaded with first data into a first low-frequency signal and sending the first low-frequency signal to a second low-frequency communication terminal using a low-frequency communication, wherein the first data refers to instruction data issued by a user; and
    when receiving the first low-frequency signal, demodulating, by the second low- frequency communication terminal, the first low-frequency signal into the first carrier signal and analyzing the first carrier signal to obtain the first data,
    wherein the low-frequency communication with external devices is realized while self-charging is implemented through resonance oscillation subjected to antenna coils with capacitors in parallel inductance-capacitance resonant loops.

2. The wireless low-frequency communication method as claimed in claim 1, wherein after said modulating, by the first low-frequency communication terminal, the first carrier signal loaded with the first data into the first low-frequency signal and said sending the first low-frequency signal to the second low-frequency communication terminal, the method further comprises:
    performing the self-charging when the second low-frequency communication terminal receives the first low-frequency signal.

3. The wireless low-frequency communication method as claimed in claim 1, wherein after when receiving the first low-frequency signal, demodulating, by the second low-frequency communication terminal, the first low-frequency signal into the first carrier signal and analyzing the first low-frequency signal to obtain the first data, the method further comprises:
    measuring, by the second low-frequency communication terminal, to obtain second data according to the instruction data, wherein the second data refers to internal temperature data of food under heating, modulating a second carrier signal loaded with the second data into a second low-frequency signal, and sending the second low-frequency signal to the first low-frequency communication terminal; and
    when receiving the second low-frequency signal, demodulating, by the first low-frequency communication terminal, the second low-frequency signal into the second carrier signal and analyzing the second carrier signal to obtain the second data.

4. The wireless low-frequency communication method as claimed in claim 3, wherein when receiving the second low-frequency signal, demodulating, by the first low-frequency communication terminal, the second low-frequency signal into the second carrier signal and analyzing the second carrier signal to obtain the second data, the method further comprises:
    displaying the second data, sending an overtemperature alarm when determining that the second data exceeds a preset temperature threshold, and sending the internal temperature data to a mobile phone terminal when receiving a request from the mobile phone terminal.

5. The wireless low-frequency communication method as claimed in claim 1, wherein after when receiving the first low-frequency signal, demodulating, by the second low-frequency communication terminal, the first low-frequency signal into the first carrier signal and analyzing the first low-frequency signal to obtain the first data, the method further comprises:
    measuring, by the second low-frequency communication terminal, to obtain second data and number data according to the instruction data, wherein the second data refers to internal temperature data of food under heating, modulating a second carrier signal loaded with the second data and the number data into a second low-frequency signal, and sending the second low-frequency signal to the first low-frequency communication terminal; and
    when receiving the second low-frequency signal, demodulating, by the first low-frequency communication terminal, the second low-frequency signal into the second carrier signal and analyzing the second carrier signal to obtain the second data and the number data.

6. The wireless low-frequency communication method as claimed in claim 5, wherein after when receiving the second low-frequency signal, demodulating, by the first low-frequency communication terminal, the second low-frequency signal into the second carrier signal and analyzing the second carrier signal to obtain the second data and the number data, the method further comprises:
    displaying the second data and the number data, sending an overtemperature alarm of a corresponding number when determining that the second data exceeds a preset temperature threshold, and sending the second data and the number data to a mobile phone terminal when receiving a request from the mobile phone terminal.

7. A wireless low-frequency communication system, comprising:
    a first low-frequency communication terminal configured to modulate a first carrier signal loaded with first data into a first low-frequency signal and send the first low-frequency signal to a second low-frequency communication terminal using a low-frequency communication, wherein the first data refers to instruction data issued by a user; and
    a second low-frequency communication terminal configured to, when receiving the first low-frequency signal, demodulate the first low-frequency signal into the first carrier signal and analyze the first carrier signal to obtain the first data,
    wherein the low-frequency communication with external devices is realized while self-charging is implemented through resonance oscillation subjected to antenna coils with capacitors in parallel inductance-capacitance resonant loops.

8. The wireless low-frequency communication system as claimed in claim 7, wherein the second low-frequency communication terminal is also configured to perform the self-charging when receiving the first low-frequency signal.

9. The wireless low-frequency communication system as claimed in claim 7, wherein the second low-frequency communication terminal is also configured to measure to obtain second data according to the instruction data, wherein the second data refers to internal temperature data of food under heating, modulate a second carrier signal loaded with the second data into a second low-frequency signal, and send the second low-frequency signal to the first low-frequency communication terminal; and the first low-frequency communication terminal is also configured to, when receiving the second low-frequency signal, demodulate the second low-frequency signal into the second carrier signal and analyze the second carrier signal to obtain the second data, display the second data, send an overtemperature alarm when determining that the second data exceeds a preset temperature threshold, and send the internal temperature data to a mobile phone terminal when receiving a request from the mobile phone terminal.

10. The wireless low-frequency communication system as claimed in claim 7, wherein the second low-frequency communication terminal is also configured to measure to obtain second data and number data according to the instruction data, wherein the second data refers to internal temperature data of food under heating, modulate a second carrier signal loaded with the second data and the number data into a second low-frequency signal, and send the second low-frequency signal to the first low-frequency communication terminal; and the first low-frequency communication terminal is also configured to, when receiving the second low-frequency signal, demodulate the second low-frequency signal into the second carrier signal and analyze the second carrier signal to obtain the second data and the number data, display the second data, send an overtemperature alarm of a corresponding number when determining that the second data exceeds a preset temperature threshold, and send the internal temperature data to a mobile phone terminal when receiving a request from the mobile phone terminal.

* * * * *